United States Patent Office 3,437,642
Patented Apr. 8, 1969

3,437,642
METHOD OF PRODUCING RESINS FROM NONTERMINAL EPOXY PHENOLIC ESTERS
William S. Port, Norristown, and Daria M. Ostapiak, Philadelphia, Pa., assignors to the United States of America as represented by the Secretary of Agriculture
No Drawing. Original application Mar. 27, 1961, Ser. No. 98,717, now Patent No. 3,305,564, dated Feb. 21, 1967. Divided and this application June 14, 1966, Ser. No. 568,089
Int. Cl. C08g 30/12
U.S. Cl. 260—78.4         7 Claims

ABSTRACT OF THE DISCLOSURE

Oleic and linoleic acids were esterified with catechol, resorcinol and hydroquinone, and the esters were epoxidized to provide monomers having predominately two or four epoxy functions per molecule. Resins obtained by heating these epoxy monomers with phthalic anhydride in the presence of a tertiary amine have favorable physical properties, in particular, relatively high heat distortion temperatures.

---

A nonexclusive, irrevocable, royalty-free license in the invention herein described, throughout the world for all purposes of the United States Government, with the power to grant sublicenses for such purposes, is hereby granted to the Government of the United States of America.

This application is a division of Ser. No. 98,717, filed Mar. 27, 1961, now U.S. Patent No. 3,305,564.

This invention relates to nonterminal epoxy resins prepared from a novel group of epoxy monomers.

Commercially available intermediates for thermosetting resins, useful in molding compositions for encapsulating delicate parts, making shaped objects, and the like, are frequently glycidyl derivatives or contain terminal epoxide groups. Processes have been developed in which epoxy ether resins and compositions containing these resins are mixed with curing (hardening) agents and, usually with slight heating, allowed to stand until a hard, cured resin is produced. In contrast to the foregoing type of epoxy resin, compounds containing nonterminal epoxides, many of which have been known for many years, are little used because these compounds are less reactive and because the cured resins derived therefrom have low heat distortion temperatures, low tensile strengths, and low moduli of elasticity. A high heat distortion temperature is an important property for many of the uses to which one may wish to apply these resins.

In our U.S. Patent No. 2,975,149, it is demonstrated that nonterminal epoxides such as epoxidized vegetable oils, epoxidized animal oils, and epoxidation products of esters prepared from unsaturated long carbon chain fatty acids and mono-, di-, and polyhydric short carbon chain saturated aliphatic alcohols were among those which produce useful resins when heated with a cyclic anhydride in the presence of a tertiary amine. In those nonterminal epoxy resins it will be noted that the heat distortion temperature of the resin product varies directly with the number of epoxy functions in the monomer in both the epoxidized oleate and epoxidized linoleate series, and that, in general, a considerable number of epoxy functions in the monomer is necessary to provide a resin with relatively high heat distortion temperature.

We have found that changing the source of the central nucleus of the monomer from a saturated aliphatic polyol such as ethylene glycol to a polyphenol such as catechol, resorcinol and hydroquinone, results in resins with improved heat distortion temperatures.

In general, according to the present invention a compound of the general formula

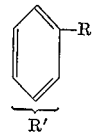

wherein R=R', the position of R' is selected from the group consisting of ortho, meta, and para with respect to R, and

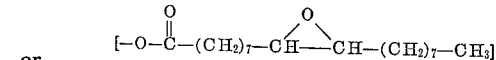

is obtained by preparing the catechol, resorcinol and hydroquinone esters of oleic and linoleic acids and then epoxidizing the ester, and a resin is prepared by combining the compound with an amount ranging from one epoxide equivalent to ±20% of one epoxide equivalent per molecule of a cyclic carboxylic anhydride such as phthalic anhydride and with about 0.1 to 4% by weight of the final mixture of a tertiary amine such as benzyldimethylamine, β-dimethylaminopropionitrile or triamylamine, and heating the mixture to effect polymerization.

The resin products ranging in physical property from flexible to stiff, all have heat distortion temperatures 40 to 50 degrees higher than corresponding resins prepared from glycol esters.

The preparation of an ester is illustrated in the following example.

EXAMPLE 1

Preparation of catechol dioleate

Catechol (11 grams, 0.1 mole) was dissolved in 30 grams of pyridine and 61.4 grams (0.202 mole) of oleoyl chloride was slowly added during the course of 1¼ hours at temperatures in the range of 10 to 32° C. The reaction mixture was then heated to 120° C. and maintained at this temperature for about 1½ hours. The reaction mixture was cooled to room temperature, poured into water, and the aqueous layer was discarded. Ether, 250 ml., was added and the ethereal solution was extracted with 2% aqueous sodium hydroxide, then washed free from alkali with water and dried over anhydrous calcium sulfate. The solvent was distilled off at reduced pressure. The residue weighed 56 grams (87.6% yield) and had an iodine number of 79.2 (theory 79.6).

TABLE I

| | Reactants | | | | Products | | | Product analysis | | | | | |
|---|---|---|---|---|---|---|---|---|---|---|---|---|---|
| | | | | | | | Yield | Carbon | | Hydrogen | | Iodine number | |
| Ex. No. | Diphenol | G. | Acid chloride | G. | Name | G. | Percent | Calc. | Found | Calc. | Found | Calc. | Found |
| 1 | Catechol | 11 | Oleoyl | 61.4 | Catechol dioleate | 56 | 88 | 78.94 | 78.82 | 11.04 | 11.18 | 79.4 | 79.2 |
| 2 | Resorcinol | 11 | ___do___ | 67 | Resorcinol dioleate | 57 | 89 | 78.94 | 77.98 | 11.04 | 11.29 | 79.4 | 81.6 |
| 3 | Hydroquinone | 11 | (¹) | 73.7 | Hydroquinone dioleate | 13.5 | 39 | 78.94 | 78.88 | 11.04 | 10.93 | 79.4 | 76.0 |
| 4 | Catechol | 7.15 | Linoleoyl | 41.7 | Catechol dilinoleate | 17.6 | 42 | 79.44 | 78.97 | 10.48 | 10.55 | 159.9 | 155.6 |
| 5 | Resorcinol | 16.5 | ___do___ | 92.5 | Resorcinol dilinoleate | 82.6 | 87 | 79.44 | 77.97 | 10.48 | 10.57 | 159.9 | 159.0 |
| 6 | Hydroquinone | 16.5 | ___do___ | 92.5 | Hydroquinone dilinoleate | 61.0 | 64 | 79.44 | 79.21 | 10.48 | 10.86 | 159.9 | 156.8 |

¹ Vinyl oleate.

A procedure similar to that of Example 1 was employed to prepare the compound of Examples 2, 4, 5 and 6 of Table I. In Example 3 is described a different procedure for making an oleate ester.

EXAMPLE 3

Preparation of hydroquinone dioleate

To 73.7 grams (0.22 mole) of vinyl oleate was added 11 grams (0.1 mole) of hydroquinone in five portions at hourly intervals while the reaction mixture was heated at 150–200° C. When evolution of acetaldehyde ceased, the reaction was cooled to room temperature and crystallized three times from acetone. The final product weighed 13.5 grams (39% yield) and melted at 65–67° C. The analytical characteristics of this material is shown in Table I.

The epoxidation of a phenolic ester is illustrated in the following example.

EXAMPLE 7

Preparation of catechol bis-(9,10-epoxystearate)

To 50 grams catechol dioleate dissolved in 150 ml. chloroform was added 45 grams peracetic acid (35% peracetic acid in acetic acid) containing 2.24 grams sodium acetate while the reaction mixture was stirred and maintained at a temperature between 25–35° C. After 3½ hours of reaction, the mixture was poured into about 300 ml. of cold water and the chloroform layer was separated. The chloroform layer was washed successively with dilute sodium bicarbonate solution and water until neutral and then dried. The chloroform was distilled off under reduced pressure and the residue (37 grams) was recrystallized from 370 ml. of acetone. The yield of catechol bis(9,10-epoxystearate), analyzing 4.74% oxirane oxygen content, was 29 grams (55% yield).

In a similar fashion the esters of Examples 2 to 6 were epoxidized to give the epoxidized compounds of Examples 7 to 12. Data pertaining to the preparation and analysis of the epoxidized compounds is presented in Table II.

In a preferred procedure for the preparation of resins, as exemplified in Example 13, the polyepoxide and the cyclic carboxylic anhydride are combined on the basis of approximately equivalents weights, that is one mole anhydride to one epoxide equivalent, although it has been demonstrated that a variation of ±20% in this formulation did not appreciably change the heat distortion temperature of the resin products.

A practical time-temperature relationship for reaction of the ingredients was determined by preliminary experimentation. As typified in Example 13, an initial temperature of 150° C., followed by curing at 120° C. for about 24 hours, gave resins whose heat distortion temperature did not appreciably improve upon further curing. When lower temperatures are used the reaction time must be increased to achieve a resin with about the same physical properties.

The tertiary amine was added at the level of 2.5% by weight of the resin ingredients in the preparation of these cured resins, but a range of levels of addition of from about 0.1 to 4% of tertiary amine is applicable to the process.

EXAMPLE 13

A solution of 3.39 grams catechol bis(9,10-epoxystearate), the monomer of Example 7, 1.48 grams phthalic anhydride, and 0.122 gram benzyldimethylamine was heated at 150° C. Gelation occurred in 3¾ hours. The polymeric product was further heated for 3 hours at 150° C. for 24 hours at 120° C. The cured resin had a heat distortion temperature of 13° C., tensile strength of 1100 lbs./square inch, and tensile modulus of $1.05 \times 10^5$ lbs./square inch.

In a similar manner the monomers of Examples 8 to 12 were processed into cured resins, and the data pertaining to reactants and physical properties of the resulting resins are included as Examples 14 to 18 along with Example 13 in Table III.

TABLE III

| Example No. | Reactants | | | Resin properties | | |
|---|---|---|---|---|---|---|
| | Product of Table II | Phthalic anhydride, G. | Benzyldi-methyla-mine, G. | Heat distortion temp., °C. | Tensile strength, lbs./sq. in. | Tensile modulus, lbs./sq. in. $\times 10^{-5}$ |
| | Example No. | G. | | | | |
| 13 | 7 | 3.39 | 1.48 | 0.122 | 13 | 1,100 | 1.05 |
| 14 | 8 | 3.35 | 1.48 | 0.123 | 23 | 1,500 | 0.88 |
| 15 | 9 | 5.00 | 2.08 | 0.177 | 16 | 960 | 0.64 |
| 16 | 10 | 3.09 | 2.61 | 0.143 | 110 | 6,000 | 2.85 |
| 17 | 11 | 4.15 | 3.26 | 0.185 | 123 | 2,000 | 1.31 |
| 18 | 12 | 4.13 | 3.26 | 0.185 | 131 | 3,800 | 0.95 |

Of the cured resins of the present invention, the products of Examples 13 to 15 were flexible materials and those of Examples 16 to 18 were hard, stiff materials, making them useful for a variety of purposes. Upon comparison of the heat distortion temperatures of these resins with those obtained from epoxidized glycol dioleate and epoxidized glycol dilinoleate in application Ser. No. 796,710 there is a difference in the resins from epoxidized glycol dioleate at −29° C. and the epoxidized dioleates of the present application (ranging from 13 to 23° C.) of 40 to 50 degrees. A similar increase in heat distortion temperature is found upon comparing the resin from

TABLE II

| Example No. | Reactants | | Product yield | | Analysis | | | | | | |
|---|---|---|---|---|---|---|---|---|---|---|---|
| | Product of Table I, example number | 35% peracetic acid, G. | G. | Percent | Carbon | | Hydrogen | | Oxirane oxygen | | Melting point °C. |
| | | | | | Calc. | Found | Calc. | Found | Calc. | Found | |
| 7 | 1 | 50 | 45 | 29 | 55 | 75.18 | 75.52 | 10.52 | 10.84 | 4.77 | 4.74 | 49–53 |
| 8 | 2 | 50 | 46 | 32 | 61 | 75.18 | 75.29 | 10.52 | 10.80 | 4.77 | 4.67 | 39–40 |
| 9 | 3 | 12 | 12 | 7 | 55 | 75.18 | 75.55 | 10.52 | 10.52 | 4.77 | 4.47 | 77–9 |
| 10 | 4 | 16 | 28 | 4.5 | 26 | 72.17 | 72.39 | 9.52 | 9.76 | 9.16 | 8.31 | 56–8 |
| 11 | 5 | 77 | 137 | 16 | 19 | 72.17 | 72.11 | 9.52 | 9.63 | 9.16 | 8.53 | 42–43 |
| 12 | 6 | 60 | 107 | 21 | 32 | 72.17 | 72.33 | 9.52 | 9.79 | 9.16 | 8.49 | 93–98 | epoxidized glycol dilinoleate (80° C.) with the epoxidized dilinoleates of the present invention (123–131° C.) Since the only difference in the respective monomers is the moiety to which the epoxidized fatty acids are attached, the enhancement of heat distortion temperature can be attributed directly to the introduction of an aromatic nucleus into the present monomers.

We claim:
1. A process for the preparation of an epoxy resin comprising heating a mixture containing an epoxy compound of the general formula wherein R=R', the position of R' with respect to R is selected from the group consisting of ortho, meta, para, and R is selected from the group consisting of

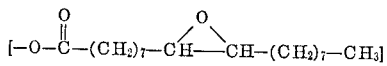

and

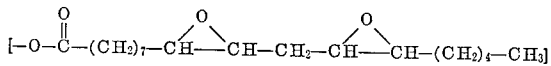

phthalic anhydride, and a tertiary amine selected from the group consisting of benzyldimethylamine, β-dimethylaminopropionitrile and triamylamine to effect polymerization, each of said compound and phthalic anhydride being present in said mixture in an amount ranging from an equimolar epoxide equivalent to ±20% of an equimolar epoxide equivalent, said tertiary amine being present in said mixture in about 0.1 to 4% by weight.

2. The process of claim 1 in which the epoxy compound is catechol bis(9,10-epoxystearate).

3. The process of claim 1 in which the epoxy compound is resorcinol bis(9,10-epoxystearate).

4. The process of claim 1 in which the epoxy compound is hydroquinone bis(9,10-epoxystearate).

5. The process of claim 1 in which the epoxy compound is catechol bis(9,10; 12,13-diepoxystearate).

6. The process of claim 1 in which the epoxy compound is resorcinol bis(9,10; 12,13-diepoxystearate).

7. The process of claim 1 in which the epoxy compound is hydroquinone bis(9,10; 12,13-diepoxystearate).

References Cited

UNITED STATES PATENTS 3,147,236  9/1964  Port et al. _____ 260—78.4

JOSEPH L. SCHOFER, *Primary Examiner.*

C. A. HENDERSON, JR., *Assistant Examiner.*

U.S. Cl. X.R.

260—2